US005648968A

United States Patent [19]

Reudink

[11] Patent Number: 5,648,968

[45] Date of Patent: Jul. 15, 1997

[54] NARROW BEAM ANTENNA SYSTEMS WITH ANGULAR DIVERSITY

[75] Inventor: Douglas O. Reudink, Bellevue, Wash.

[73] Assignee: Metawave Communications Corporation, Redmond, Wash.

[21] Appl. No.: 520,316

[22] Filed: Aug. 28, 1995

Related U.S. Application Data

[63] Continuation-in-part of Ser. No. 488,793, Jun. 8, 1995, Pat. No. 5,563,610.

[51] Int. Cl.[6] ........ H04J 13/00

[52] U.S. Cl. ........ 370/335; 375/299

[58] Field of Search ........ 370/18, 328, 335, 370/342, 479; 375/205, 267, 299, 347; 455/279.1, 278.1

[56] References Cited

U.S. PATENT DOCUMENTS

| | | | |
|---|---|---|---|
| 5,280,472 | 1/1994 | Gilhousen et al. | 370/18 |
| 5,347,535 | 9/1994 | Karasawa et al. | 375/1 |
| 5,437,055 | 7/1995 | Wheatley, III | 455/33.3 |
| 5,479,397 | 12/1995 | Lee | 370/18 |
| 5,504,936 | 4/1996 | Lee | 455/33.4 |
| 5,563,610 | 10/1996 | Reudink | 342/375 |

OTHER PUBLICATIONS

Dennis A. Jiraud, "Broadband CDMA for Wireless Communication," Applied Microwave & Wireless, pp. 22–34, (nondated).

CDMA Network Engineering Handbook, Draft Version XI, Chapter 2, pp. 2–1 through 2–12, (nondated).

*Primary Examiner*—Melvin Marcelo

*Attorney, Agent, or Firm*—Fulbright & Jaworski L.L.P.

[57] ABSTRACT

A transmitting system (80) is disclosed which includes several antennas (801–803) providing a plurality of antenna beams. The transmit signal from transmitter 81 is sent to the plurality of antennas via routing circuitry (82). The transmit signal is divided into two or more identical signals, each delayed by a selected amount. The particular antenna to which the undelayed signal, the first delayed signal and each other delayed signal is sent is selected for any instant depending on control signals provided by control (83). Control (83), in turn, could operate from a number of factors, one being the relative strengths of the received signals at each of the antennas for that particular channel. The amount of delay could, if desired, also be controlled by control (83).

22 Claims, 5 Drawing Sheets

FIG. 5
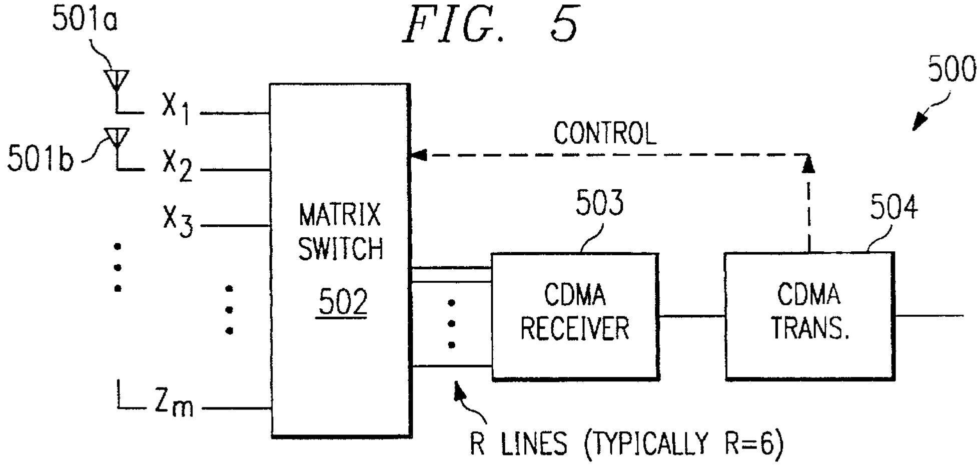
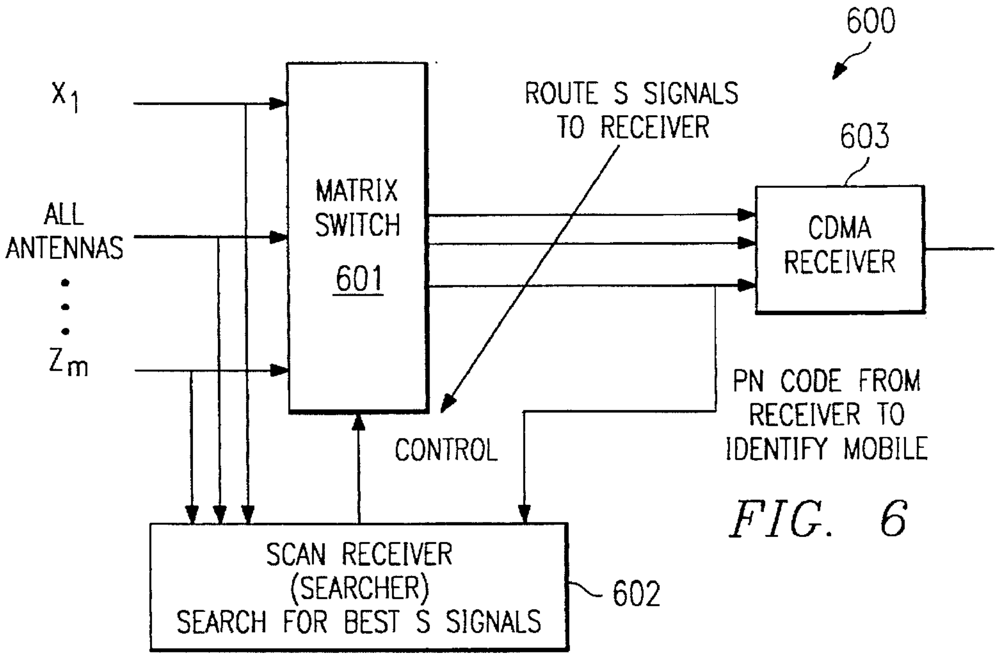
FIG. 6
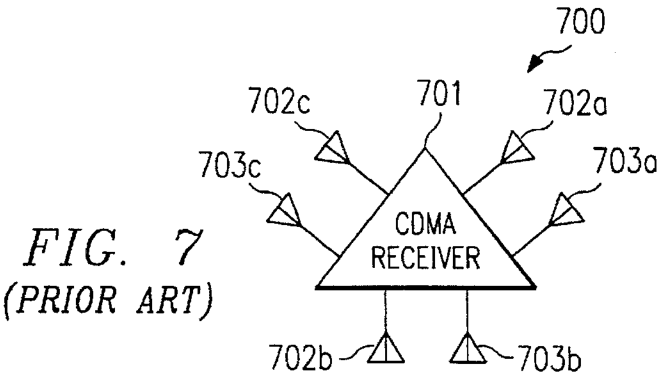
FIG. 7
(PRIOR ART)

NARROW BEAM ANTENNA SYSTEMS WITH ANGULAR DIVERSITY

RELATED PATENT APPLICATIONS

This application is a Continuation-in-Part of United States patent application Ser. No. 08/488,793 filed Jun. 8, 1995, now issued as U.S. Pat. No. 5,563,610, and entitled NARROW BEAM ANTENNA SYSTEMS WITH ANGULAR DIVERSITY which is hereby incorporated by reference herein.

This application is also related to concurrently filed, commonly assigned, application entitled "SYSTEM AND METHOD FOR FREQUENCY MULTIPLEXING ANTENNA SIGNALS," Ser. No. 08/520,000, which is hereby incorporated by reference herein.

TECHNICAL FIELD OF THE INVENTION

The present invention relates in general to wireless communications systems and in particular to apparatus, systems and methods for combining antennas in such systems for the transmission of data.

BACKGROUND OF THE INVENTION

Code division multiple access (CDMA) signalling is particularly useful in wireless communications systems, such as cellular telephone systems. Among its advantages, CDMA allows multiple users to simultaneously access a single channel. In a typical CDMA system, a pseudo-noise spreading code (in a direct sequence system a sequence of "chips") is used to biphase modulate an RF carrier. The resulting phase-coded carrier is in turn biphase modulated by a data stream. A second orthogonal code overlays the spreading code which allows a base station to individually identify and communicate with multiple mobile units. The resulting coded CDMA signal is then amplified and transmitted. At the receiver, the CDMA signal is despread and the data extracted by demodulation.

The performance of all wireless communications systems, including CDMA systems, is adversely affected by interference. One source of interference at the base station is caused by the simultaneous receipt of signals from multiple remote (mobile) units, and in particular when those mobile units are broadcasting on the same frequency. Assuming an ideal antenna and signal propagation conditions, and that the base station is receiving signals of substantially the same power from each of the mobile units, the level of interference noise is directly proportional to the number of mobile unit signals received at the base station antenna. The multiple received signals can raise the noise floor or destructively combine to cause fading. This problem is compounded when a mobile unit closer to the base station masks the signals received from mobile units further distant.

Another type of interference which adversely affects wireless communications systems is caused by multipath effects. In this case, the signal broadcast from a given mobile unit will reflect off various objects in the surrounding environment. As a result, multiple reflected signals taking multiple paths of varying path lengths arrive at the receiver. These multipath components (reflections) arrive at the receiver antenna with varying time delays (phase differences), and depending on the corresponding path lengths, may combine to produce fades in signal strength. In the worst case where multipath signals are received one-half wavelength out of phase, a null can occur do to signal cancellation.

By minimizing interference, the strength of a given mobile unit signal received at the base station antenna can be maximized. Consequently, the mobile unit to base station separation and/or the ability to extract data from that signal is improved (i.e. an improved bit-error rate is achieved). A similar result can be achieved if the gain of the receiver and/or its antenna is increased. The most substantial improvements in receiver performance occur if interference minimization is achieved in conjunction with an increase in gain.

The Rake receiver is a standard receiver often used in CDMA base wireless communications systems because of its capability of reducing multipath fading. Alternatively, omni-directional antennas may be used to feed a CDMA receiver having only a sector and a diversity port. According to the IS-95 standard, each CDMA receiver is constructed from four Rake receivers, each for resolving one "finger" (i.e. time delayed multipath components from a given mobile unit). In this case, the four strongest signals received from any sector or the diversity antennas are processed by the corresponding four fingers of the receiver and combined to improve data recovery.

It should be noted that in current CDMA receiving systems, the antennas are typically separated by a predetermined number of wavelengths in order to provide spacial diversity. This spacial diversity insures that the incoming multipath components from a given mobile unit transmission are substantially uncorrelated. Two such prior art systems are disclosed in U.S. Pat. No. 5,347,535 to Karasawa et al., entitled "CDMA Communications System," and U.S. Pat. No. 5,280,472 to Gilhousen et al., entitled "CDMA Microcellular Telephone System And Distributed Antenna System Therefor."

If the number of required antennas could be reduced, and/or the need to space antennas by substantial distances could be eliminated, a more compact and less complicated CDMA base station could be built. Further, if in doing so, interference reduction and gain improvement could also be achieved, the receiver operation could simultaneously be improved.

In sum, the need exists for improved apparatus, systems and methods for receiving CDMA signals in a wireless communications system. Such apparatus, systems and methods should reduce fading caused by interference and improve receiver gain. Further, the ability to build a more compact Rake receiver based CDMA receiver system would also be of substantial advantage.

In addition, a need exists in the art for a system to eliminate interference at the wireless receiver. One of the problems experienced at such receivers is that reflected signals can arrive which destructively add together in a manner to create a null condition at the receiver.

Accordingly, a need exists in the art for a system to increase signal strength and to avoid null conditions at wireless receiver stations without regard to the reflections and other interference at the receiver.

SUMMARY OF THE INVENTION

The principles of the present invention takes advantage of my above referenced copending patent application, Ser. No. 08/488,793, filed Jun. 8, 1995, assigned to a common assignee, such that the multiple antenna beams of the copending application are used to send multiple signals from different antennas to the mobile receiver. The signals from each antenna are delayed an amount such that they cannot accept multiple signals and add them together to obtain a stronger signal. The multiple signals are sent out on selected ones of a number of possible antennas, the selection occurring based upon the determined "best" signal strengths of the received signals from these same antennas.

In the copending patent application, multiple antenna beams are used to feed a smaller number of receiver input ports. Such multiple beams may be provided by either a single multibeam antenna or a plurality of co-located discreet antennas. By using multiple, narrow, beams to focus on selected mobile units, interference can be substantially reduced and antenna gain substantially increased. Receiving systems embodying the principles of the present invention can be advantageously applied to wireless communication systems, such as cellular telephone systems, although such principles are not necessarily limited to these applications.

According to one embodiment of the present invention, a transmitting system is provided which includes at least one transmitter channel and a multibeam transmitting antenna providing a plurality of transmission beams to a mobile station.

According to another embodiment of the present invention, a wireless communications transmitting system is provided which includes a plurality of antennas and a CDMA receiver, a number of inputs thereto, each delayed a certain amount from the other. A matrix switch is provided for coupling the delayed inputs to selected ones of the antennas.

The principles of the present invention provide substantial advantages over the prior art. In particular, multiple antennas may be connected to a transmitting source which has a number of delayed output sources for connection to a number of antennas. The precise association between output sources and antennas is controlled by a determination of which antennas will give the best reception. In one embodiment, this is determined by the relative strengths of signals received on each antenna from the desired receiver. Further, according to the present invention, narrow beam antennas may be used with a mobile receiver to substantially reduce interference and provide increased receiver gain. Further, antennas constructed in accordance with the principles of the present invention do not require substantial, or even precise, spacing between antennas, as is required in present antenna systems to ensure that outgoing signals are uncorrelated.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIG. 5 is a functional block diagram of an alternate receiving system according to the present invention;

FIG. 6 is a functional block diagram of another alternate receiving system according to the present invention;

FIG. 7 is a functional block diagram of a prior art CDMA receiving system; and

DETAILED DESCRIPTION OF THE INVENTION

The principles of the present invention and their advantages are best understood by referring to the illustrated embodiment depicted in FIGS. 1–7 of the drawings, in which like numbers designate like parts.

FIG. 7 is a general block diagram of a CDMA base station configuration 700 typically used in presently available wireless communications systems, such as cellular telephone systems. In the conventional system of FIG. 7 the CDMA receiver 701 receives signals from three "faces," each of which covers a 120 degree sectors. Each sector is concurrently covered by two antennas: a sector antenna 702 with a 120 degree field of coverage and diversity antenna 703, also with a field of coverage of 120 degrees. The sector antenna 702 and diversity antenna 703 for each face is physically spaced by approximately 10–15 times the wavelength of the received signal. In current cellular telephone CDMA systems, this equates to approximately ten feet. While further separation would be desirable to insure that the incoming signals are uncorrelated, increased separation is typically impractical due to space limitations.

Figure 1A:
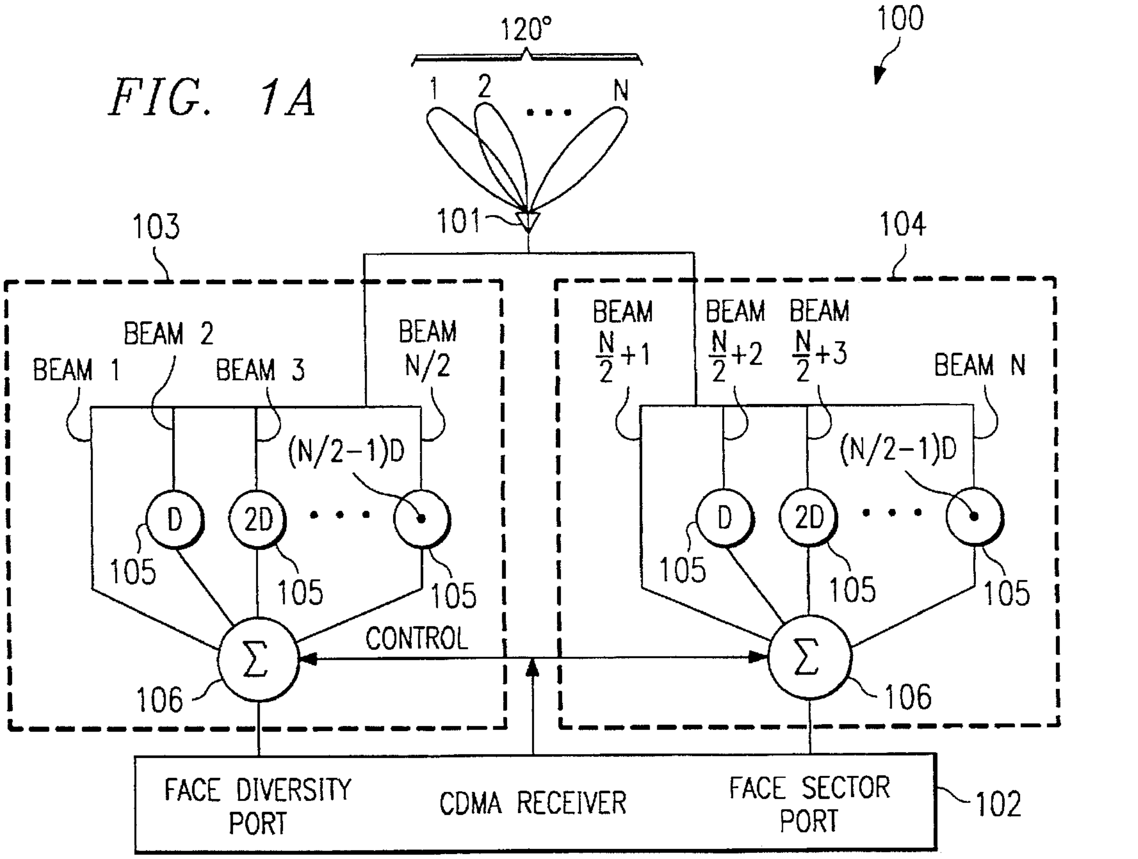
FIGS. 1A and 1B are functional block diagrams of exemplary receiving systems according to the principles of the present invention.

FIG. 1A is a block diagram of one face of a CDMA receiving system 100 according to one embodiment of the principles of the present invention. An N-beam multibeam antenna 101 feeds both the face sector input port and the face diversity input port of a CDMA receiver 102 through a pair of parallel processing branches 103 and 104. In a three sector configuration, the N beams of antenna 101 together provide a coverage area of 120 degrees (one sector). Multibeam antenna 101 may also be an omni-directional (i.e., multiple beams, for example twelve, covering 360 degrees) for use in a system configuration where CDMA receiver 102 includes only a sector port and a diversity port. In the preferred embodiment, antenna 101 comprises a series of dipoles spaced in front of a ground plane in conjunction with a Butler matrix. In alternate embodiments, any of a number of multiple beam antennas known in the art can be used.

Figure 1B:
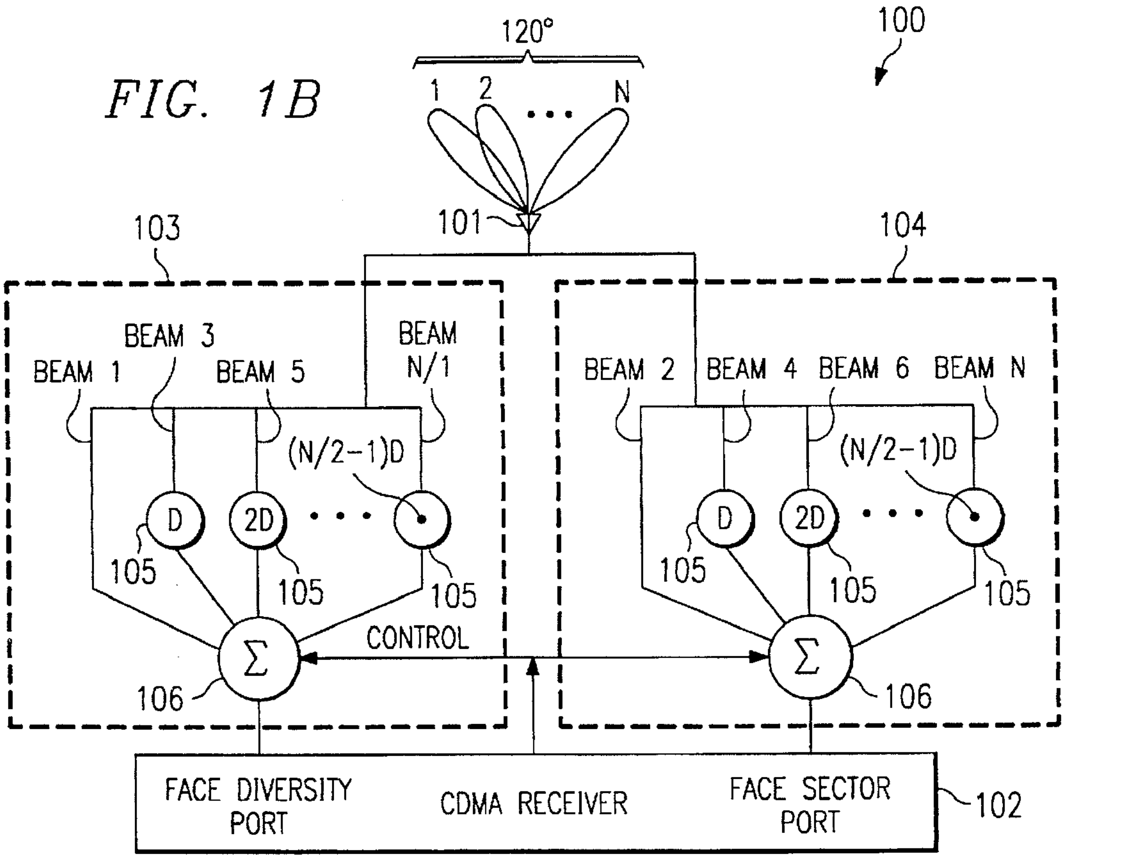
Figure 2:
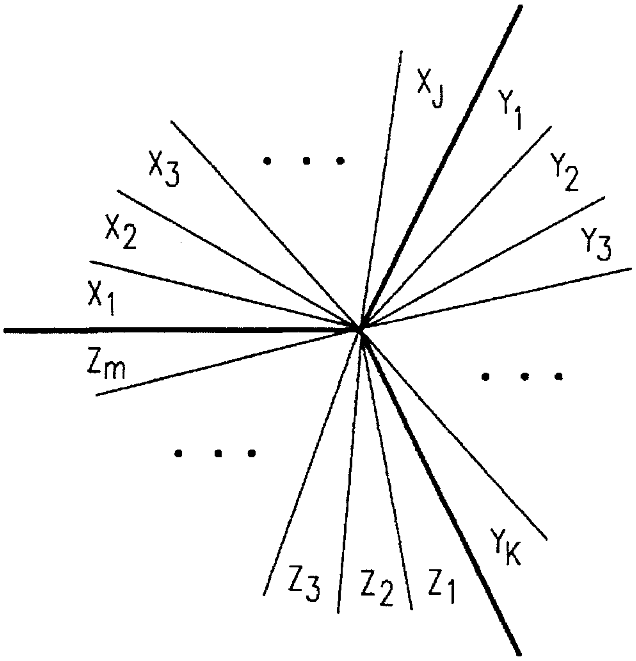
FIG. 2 is a beam diagram depicting one possible distribution of antenna beams according to the principles of the present invention.

The coverage from a three face configuration is shown for illustrative purposes in FIG. 2. Three multibeam antennas systems 100 are employed to cover 360 degrees with one antenna providing beams X1–Xj to the first face, a second providing beams Y1–Yk to a second face and a third antenna providing beams Z1–Zm to a third face. The variables j, k, and m are each equal to the variable N in FIG. 1.

In the embodiment of FIG. 1A, the first half of the N beams from antenna 101 (i.e beams 1 to N/2 consecutively) feed the diversity port through branch 103 and the second half of the beams (i.e. beams N/2+1 to N consecutively) feed the sector port through branch 104. In alternate embodiments, beams 1 to N/2 can feed the sector port through branch 104 and beams N/2+1 to N feed the diversity port through branch 103 without affecting system operation. A second embodiment of system 100 is shown in FIG. 1B, where the odd numbered beams are processed through branch 103 and the even number beams are processed through branch 104. A number of other splits of the beams from antenna 101 through branches 103 and 104 are possible according to the principles of the present invention.

Each branch 103 and 104 includes a plurality of signal delay devices 105 and a combiner 106. The signals received by the respective beams are subjected to varying amounts of delay such that they are time-wise spread when they reach the corresponding ports of receiver 102. In the FIG. 1A embodiment, the beam with the lowest indicia (number) for each branch 103 and 104 (i.e beam 1 and beam N/2 respectively) is passed to combiner 106 without the introduction of a delay. The beam with the second lowest indicia (i.e beams and N/2+1) receives a delay of one delay unit D, the next beams a delay of two delay units 2D, and so on. Ultimately, beams N/2 and N are delayed by (N/2−1)D units of delay. In other words, the delay for the signals output appearing within a given antenna beam having a beam number B is (B−1)D.

The unit of delay D can be approximated from the formula:

$$DN/2<64\ usec$$

where D is the unit of delay and N is the number of antenna beams, as discussed above. This constraint arises because in current CDMA receiving systems an adjacent sector (face) could be receiving and processing signals with a 64 usec delay with respect to the current phase. In other words, the signals received at the current sector are not delayed more than 64 usec such that they do not overlap signals from the adjacent face reaching the ports of receiver 102.

Experimental evidence has shown that most multipath reflections resulting from a transmission arrive at an omnidirectional antenna generally within 3–4 usecs from the arrival of the first signal from the transmission (typically the direct signal). This corresponds to an approximate difference in path length of 3000 to 4000 feet. Further, most reflections off distant mirrors are substantially attenuated. For example, if a mobile is removed from the base station by 4 usecs, a reflection off a mirror 2 usecs further distant will return a signal to that base station 4 usecs after the first signal arrival, but attenuated by 6 dB. In sum, for a given transmission, very little energy is received from a given transmission more than 5 usecs after arrival of the first received signal.

The outputs of combiner 106 are fed to the sector and diversity ports of CDMA receiver 102. In the preferred embodiment, CDMA receiver 102 comprises a four finger Rake receiver whose front end delays substantially match the delays through branches 103 and 104. In the case of a four finger Rake receiver, the four strongest signals from all the faces are preferably taken for processing after the delays of branches 103 and 104. Alternatively, the four strongest signals from a single selected face may be taken at a time.

In the preferred embodiment, delays 105 are implemented with surface acoustic wave (SAW) devices (e.g. SAW filters). Such devices achieve delay by converting electrical energy into acoustic waves, usually in a quartz crystal, and then recoupling the acoustic waves back into electrical energy at their output. Advantageously, such devices are compact and eliminate the unwieldy cables used to introduce delays in the prior art systems.

Also, in the preferred embodiment, combiners 106 are adaptive summing devices which perform signal combining as a function of signal power. The stronger the signal, the more weight that signal is given during the combining. For optimal performance, combiners 106 add signals according to the square of the signal power in each path (maximal ratio combining). If a path is carrying no signal, the path is attenuated strongly producing a weight of near zero. Preferably, CDMA receiver 102 includes a searcher or scan receiver which controls the adaptive summing devices and sets the weights. In the alternate embodiments, where no searcher or scan receiver is provided, the weights can be set as equal.

Figure 3:
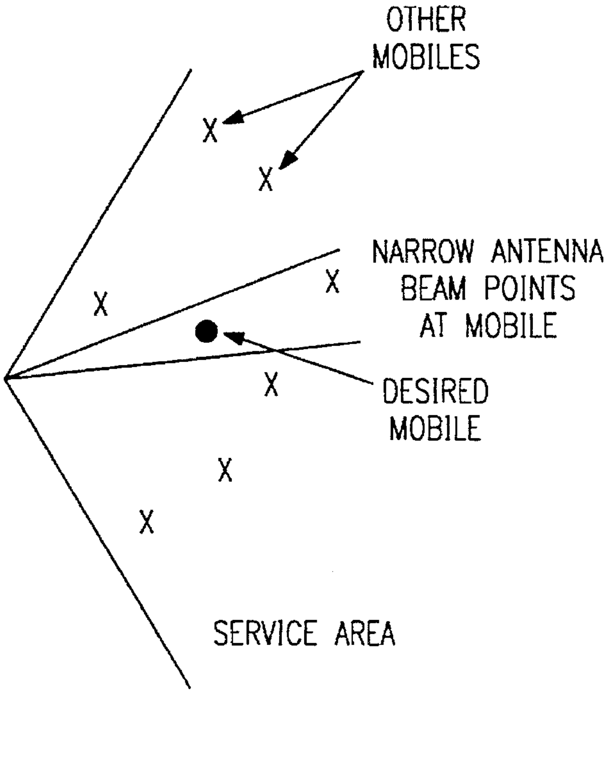
FIG. 3 is a diagrammatic illustration of the operation of the system of FIGS. 1A and 1B.

By employing narrow multiple beams instead of the wide single beams used in present systems, substantial performance improvement is achieved. First, since narrow beams are more highly directional, focus on the signal from a desired mobile in a wireless communications system can be made to the exclusion of signals from other mobiles operating in the same sector. This focusing is preferably done on the basis of the module user's assigned identification code. This feature reduces the interference from undesired mobiles. An example is shown in FIG. 3 where eight mobile units are operating in the sector with the CDMA attempting to receive a single mobile (based on the users identification code). Six of the other mobiles are excluded as being outside the beam coverage of the narrow beam directed at the desired mobile; noise from direct signals is thereby reduced from 7 noise units to 1.

With the present invention, substantial spacing is not required to maintain signal separation. Each beam (from either a multiple-beam antenna or a plurality of discrete antennas) has a different angular coverage (i.e. each beam has a different view). Thus, angular rather than spacial diversity is achieved. Since each beam is viewing a different phase front, the signals received by such beams are uncorrelated and can be accordingly processed by the Rake receiver.

Further, narrower beams generally provided higher gain. Higher gain allows the mobiles to transmit with less power or operate over longer paths (separations from the base station) with the same power. Finally, the multibeam approach is advantageously compact.

It should be noted that the antenna beams may be polarized to further improve performance. Mobile users very rarely hold the mobile unit antenna vertically such that the polarization of the mobile unit antenna matches that of the base station. As a result, the component in the cross-polarization direction is lost at the base station. Antenna 101 may therefore be constructed from two polarized multibeam antennas whose patterns overlap such that the cross-over from one pattern is at the peak of the other. The polarization of the second antenna is preferably orthogonal (or at least offset) from the polarization of the first antenna. For example, the first and second antennas may be right hand and left hand circularly polarized, respectively.

Figure 4:
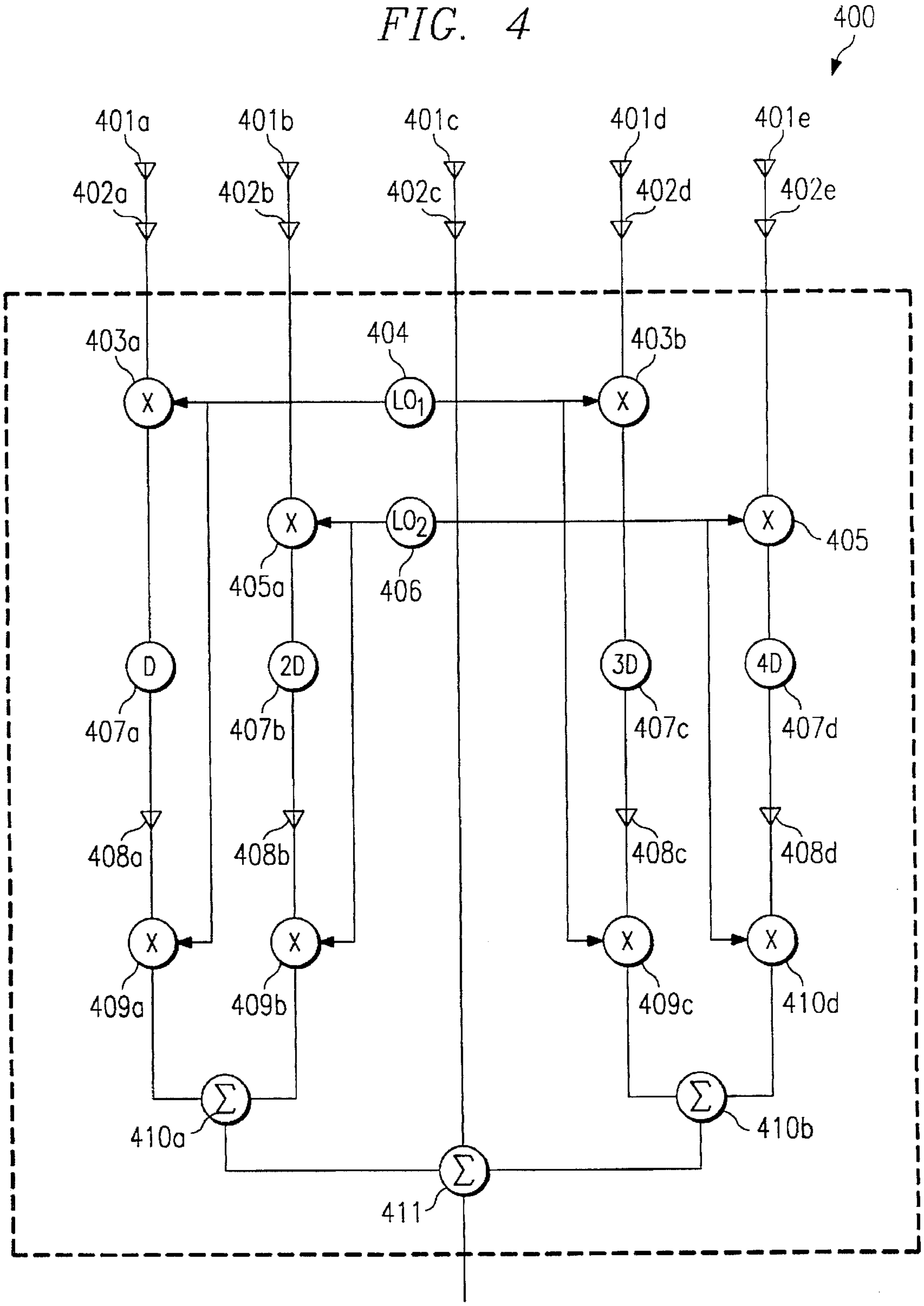
FIG. 4 is a functional block diagram of an alternate antenna system for use in a receiving system embodying the present invention.

The principles of the present invention are not limited to the use of multibeam antennas and may be equally applied to systems using multiple discrete antennas. A discrete antenna system 400 according to the principles of the present invention is depicted in FIG. 4. In a conventional CDMA receiving system, two antenna systems 400 are employed per face, one to feed the sector port and the other to feed the diversity port.

Antenna system 400 includes N-number of antennas 401. Five antennas 401*a*–401*e* are depicted in FIG. 1, although in alternate embodiments the number N will vary. The coverage of antennas 401 will also vary from application to application. For example, for a three sector receiving system, the N-number of antennas will provide 120 degrees of coverage for the corresponding face and in an omni-directional system provide 360 degrees of coverage.

The signals output from each of antennas 401 are passed through a low noise amplifier 402 to improve the system noise figure. Next, the signals from each antenna 401, with the exception of the signals from antenna 401*c*, are mixed down by mixers 403. In the illustrated embodiment, the signals from antennas 401*a* and 401*d* are mixed with a signal from local oscillator (LO1) 404 with mixers 403*a* and 403*b* and the signals from antennas 401*b* and 401*e* are mixed from a second local oscillator (LO2) 406 with mixers 405*a* and 405*b*. Local oscillators 404 and 406 preferably output a local oscillator signal at the same frequency. In cellular telephone and PCS systems where the incoming RF signals are at a frequency of 800 MHz or 1.8 GHz, the local oscillator signal is selected to provide an IF signal of 70 or 140 MHz. Two local oscillators 404 and 406 are provided in the illustrated embodiment such that if one fails, some system receiving capability is maintained. In alternate embodiments, only a single local oscillator may be used.

After mixing, the IF signals are passed through delays 407*a*–407*d*. The delays are selected according to the principles of the present invention discussed above. The output of each of the delays 407 is then passed through a corresponding amplifier 408. The gain of amplifiers 408 is set proportional to the signal energy on that path. Next, the IF signals are up mixed using local oscillators 404 and 406. By mixing back to the original RF frequency, antenna system 400 appears transparent to the CDMA receiver with regards to frequency.

The delayed outputs from antennas 401*a* and 401*b* are combined with combiner 410*a* and the delayed outputs of antennas 401*d* and 401*e* are combined with combiner 410*b*. The output of combiners 410*a* and 410*b* and the direct output of antenna 410*c* are then combined with combiner 411, whose output is fed to the respective sector or diversity port of the associated receiver.

It should be noted that the center antenna 401*c* in this embodiment may be used in different ways depending on the application. For example, it could be switched to the receiver as a path with a delay of zero and have a field of view similar to the other antennas 401. In the alternative, antenna 401*c* may encompass the entire field of view of antennas 401 and output signals at a lower power level. For example, if antennas 401*a*, 401*b*, 401*d* and 401*e* together cover a 120° sector, antenna 401*c* similarly covers 120 degrees. In this case, antenna 401*c* normally would not be selected but used only if the delayed paths failed; the single antenna 401*c* would still provide some reduced performance.

Antenna system 400 not only allows for discrete narrow beam antennas to be used in a receiving system, but also allow for the use of multiple antennas in CDMA receiving systems in which the receiver has a limited number of input ports. For example, some CDMA receivers are designed to operate with omni-directional antennas and thus only have one sector port and one diversity port. According to the present invention, multiple narrow beam antennas can be coupled to those ports. The narrow beam approach of system 400 advantageously provides higher gain, reduced multipath and reduced outside interference, as well as increasing the number of antennas which may be used.

An alternative embodiment of the principles of the present invention is depicted in FIG. 5. Receiving system 500 uses multiple discrete antennas 501 to direct narrow beams to the mobile units. The advantages of narrow beams have been discussed above. In the embodiment of FIG. 5, a matrix switch 502 switches a selected number of antennas to CDMA receiver 503. The CDMA transmitter 504 is also shown for reference. Assume for discussion purposes that the three face system of FIG. 2 is being implemented.

If j, k, and m (in this case the number of antennas per sector) are less than or equal to R, the number of lines coupling matrix switch 502 and receiver 503, either the x, y, or z antenna group is switched to CDMA receiver 503. R is typically 6 for conventional CDMA receivers. The determination of which group is switched is determined by the sector receiver 502 is using.

Assuming for discussion that R=6, if j=k=4, then the output from two selected antennas per sector are coupled to receiver 503. Preferably, the two selected antennas are those disposed immediately adjacent the next sector. Receiver 503 automatically selects the three antennas providing the strongest output. Many other combinations are possible.

Finally, assuming j, k, or m is greater than R, then the apparatus and methods discussed above with regards to FIGS. 1–3 are preferably employed.

FIG. 6 depicts a further system for receiving CDMA signals. As with the apparatus, systems and methods discussed above, the system of FIG. 6 advantageously allows for the use of narrow beam antennas and/or for the use of more antennas than inputs are available at the receiver. In this system, the antennas X1–Zm are coupled to a matrix switch 601. Matrix switch 601, under the control of a scan receiver 602, selectively couples S number of signals to a CDMA receiver 603. Scan receiver 602 may or may not be integral with CDMA receiver 603.

Specifically, during operation, scan receiver 602 searches across all the antennas for the S number of strongest signals bearing the identification code of the desired mobile. Once these signals have been identified, matrix switch 601, under control of scan receiver 602, couples those antennas outputting the S strongest signals with CDMA receiver 603.

Figure 8:
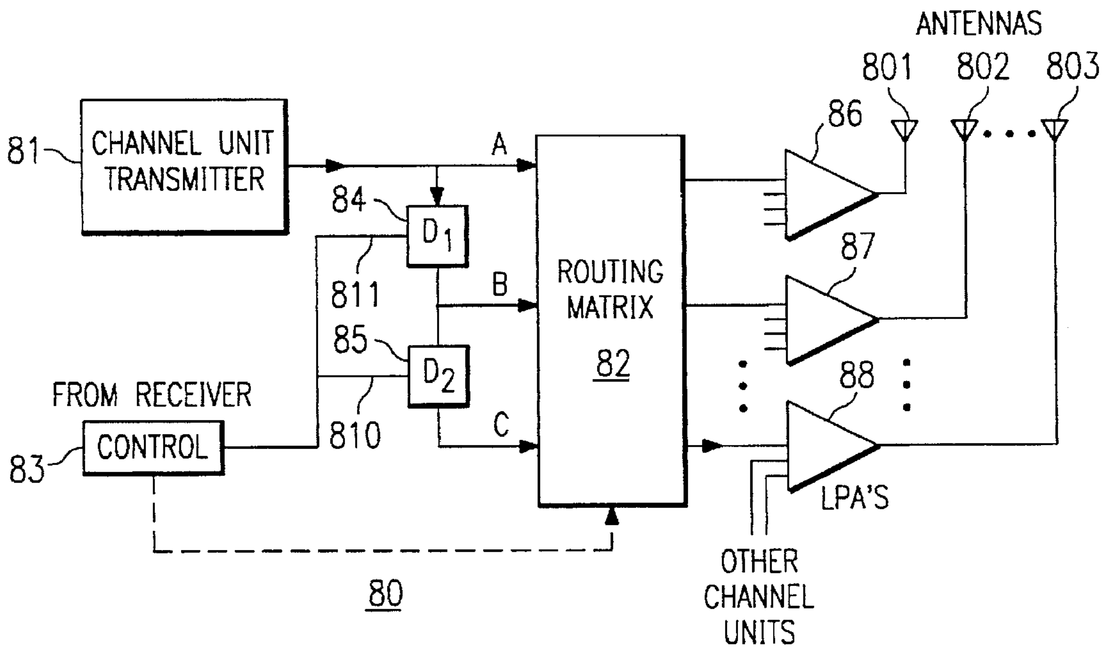
FIG. 8 is a functional block diagram of an embodiment of the present invention.

Turning now to FIG. 8, system 80 controls the transmission of a signal over several antennas 801–803. Routing matrix 82 sends a non-delayed signal A optimized from transmitter 81, to the beam which had the strongest receive signal from the desired mobile receiver. A second delayed signal B (delayed between 3 and 20 micro seconds from the original signal) is routed to the antenna beam (such as 801) which has the second strongest receive signal. An optional third delayed signal C is routed to the antenna beam which received the third strongest signal. The control signal produced by control 83 is derived from the CDMA receiver as will be discussed below.

Power levels for beams B and C are chosen to minimize total transmit power. The actual implementation may involve using baseband digital delays at the channel unit 81. Likewise, the routing matrix would be performed at baseband or IF.

From the system discussed above with respect to FIGS. 1A or 1B and as shown in FIGS. 5 or 6, it is possible to determine which antenna beam produces the strongest receive signal, the second strongest signal, etc. This data, for each mobile radio, is held in memory. Depending upon the relative strength of each signal from each of the respective antenna beams and upon any other algorithm deemed appropriate (for example, samples at various intervals), the control signals from control 85 are derived. Control 83 can be set up to "anticipate" relative strengths depending, for example, on detected changes in incoming signals and predicted changes which are anticipated at various times. The predictions can be made by a statistical engine obtaining data from the stored strength data and by monitoring the changes in signal strengths over time. The delay time between the transmit signals and its delayed component can be variable depending upon transmission parameters, and controllable by data maintained on the relative signal strengths.

Although the present invention and its advantages have been described in detail, it should be understood that various changes, substitutions and alterations can be made herein without departing from the spirit and scope of the invention as defined by the appended claims.

What is claimed is:

1. A transmission system comprising:

a plurality of substantially collocated antennas each having a narrow beam associated therewith, said antennas disposed to provide angular diversity among said beams wherein said beams are substantially non-overlapping;

a transmit signal for broadcasting over a selected subset of said antennas;

means for creating at least a second signal from said transmit signal, said second signal delayed from said transmit signal; and means for changeably directing said transmit signal to a first selected one of said subset of antennas, and for changeably directing said second delayed signal to a second selected other of said subset of antennas.

2. The transmission system as set forth in claim 1 further including:

means for selecting said first and said second selected antennas from information obtained from signals incoming to said antennas.

3. The transmission system as set forth in claim 2 wherein said selecting means includes means for determining the relative strengths of signals received from various of said antennas.

4. The transmission system as set forth in claim 1 wherein said transmit signal is a plurality of signals, and wherein said system further includes:

means for creating at least a third delayed signal for each of said transmit signals; and wherein said directing means also includes:

means for directing each different transmit signal and that transmit signal's second and third delayed signals to selected first, second and third antennas.

5. The transmission system as set forth in claim 1 wherein said subset of antennas is spaced across a section of a CDMA mobile telecommunication system.

6. The transmission system as set forth in claim 1 wherein said means for creating said second signal includes a surface acoustic filter.

7. The transmission system as set forth in claim 1 wherein said second signals are delayed from said transmit signal by Useconds.

8. The transmission system as set forth in claim 1 wherein a third delay signal is delayed from said transmit signal by Useconds.

9. The transmission system as set forth in claim 1 wherein the delay time between said transmit and said delayed signal is determined to avoid destructive addition of said signals at a receiver site.

10. The transmission system as set forth in claim 1 wherein the delay time between said transmit and said delayed signals is determined to increase the overall signal strength.

11. The transmission system as set forth in claim 1 wherein the transmit signal strength and the delayed signal transmit strength are selected to minimize the total power requirements of said signals.

12. A transmission method comprising the steps of:

accepting a transmit signal for delivery over an antenna system including a plurality of substantially non-overlapping antenna beams having a substantially collocated source;

creating at least a second signal from said transmit signal, said second signal delayed from said transmit signal; and switchably directing said transmit signal to a first selected one of said antenna beams and said second delayed signal to a second selected other of said antenna beams.

13. The method as set forth in claim 12 further comprising the step of:

selecting said first and said second antenna beams from information obtained from signals incoming to said antennas.

14. The method as set forth in claim 13 wherein said selecting step includes the step of:

determining the relative strengths of signals received from various of said antenna beams.

15. The method as set forth in claim 12 further comprising the steps of:

creating at least a third signal from said transmit signal, said third signal delayed from said transmit signal; and directing each of said transmit signal, said second signal, and said third signal to a selected first, second and third antenna beam of said antenna system.

16. The method as set forth in claim 12 wherein said first and second antenna beams are spaced across a sector of a CDMA mobile telecommunication system.

17. The method as set forth in claim 12 wherein said second signal creating step includes the step of:

passing the accepted transmit signal through a surface acoustic filter.

18. The method as set forth in claim 12 wherein said second signal is delayed from said transmit signal between 3 and 20 micro seconds.

19. A cellular antenna site comprising:

a plurality of substantially collocated antennas disposed to provide substantially non-overlapping beams for accepting signals and delayed components of said signals from a plurality of single point transmission sites;

means for determining relative signal strengths among a signal and its delayed components for a particular signal emanating from a single site;

means for accepting transmit signals from a transmitter for delivery to selected ones of said transmission sites over said plurality of antennas;

means for directing said transmit signal for a particular single point site to a subset of said antennas including at least two of said antennas having the strongest relative signal strengths for signals incoming from said particular single point site; and means, operable with said determining means, for changing which subset of antennas said transmit signal is directed to depending upon relative signal strengths from said particular single point site at any given point in time.

20. The method as set forth in claim 19 wherein said directing means includes means for predicting for a given period of time which ones of the antennas would have the strongest relative signal strengths for signals incoming from said single point site.

21. The method as set forth in claim 19 further including:

means for delaying the transmit signal between said at least two said antennas by a finite amount.

22. The method as set forth in claim 21 wherein the delay time between said at least two antennas is variable depending upon transmission parameters.

* * * * *